4 Sheets—Sheet 1.

H. R. PACKARD.
Machine for Affixing Caps to Nails and Tacks.

No. 239,833. Patented April 5, 1881.

Witnesses:
W. J. Cambridge
Chas. E. Griffin

Inventor,
Henry R. Packard
per T. E. Teschemacher
Atty

N. PETERS, PHOTO-LITHOGRAPHER, WASHINGTON, D.C.

H. R. PACKARD.
Machine for Affixing Caps to Nails and Tacks.
No. 239,833. Patented April 5, 1881.
4 Sheets—Sheet 2.
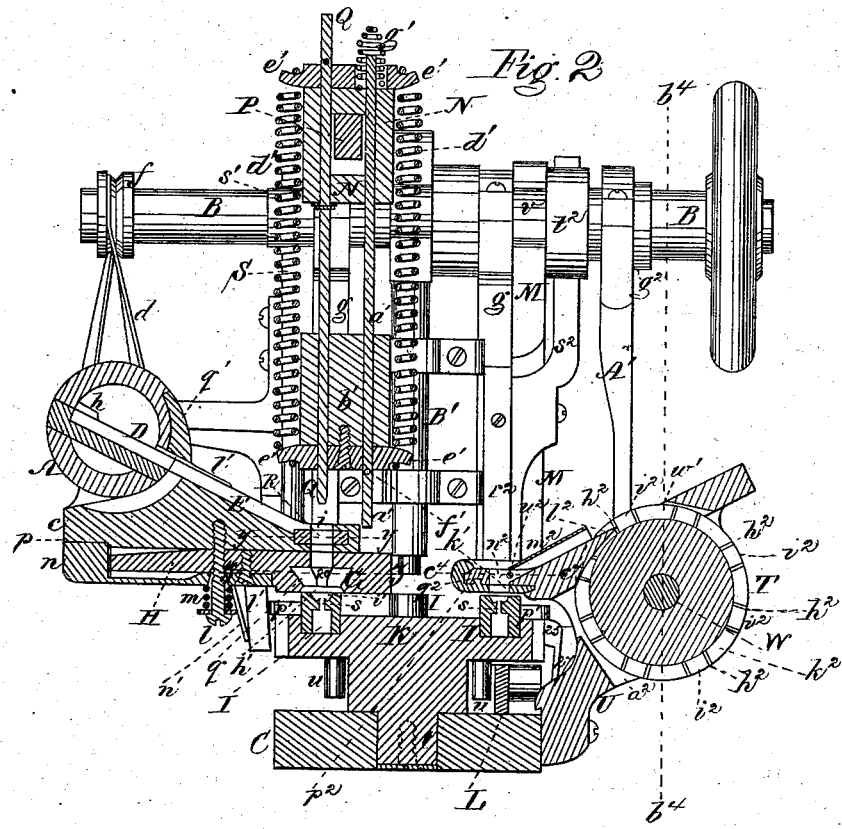
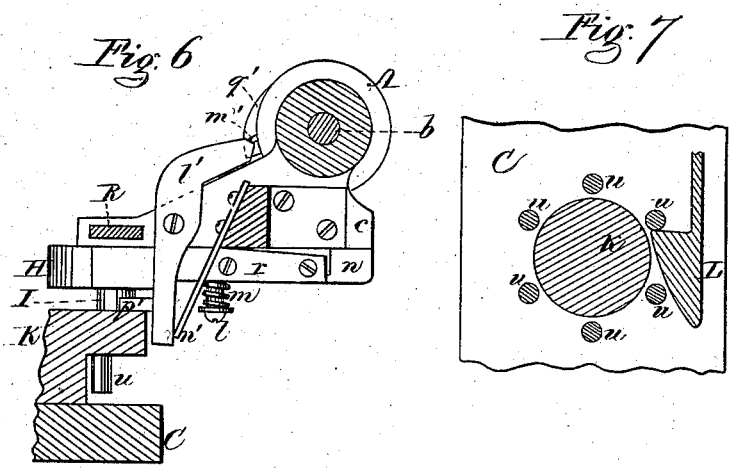
Witnesses:
W. J. Cambridge
Chas. E. Griffen
Inventor,
Henry R. Packard
per T. H. Tuchemacher
(Atty)

H. R. PACKARD.
Machine for Affixing Caps to Nails and Tacks.
No. 239,833. Patented April 5, 1881.
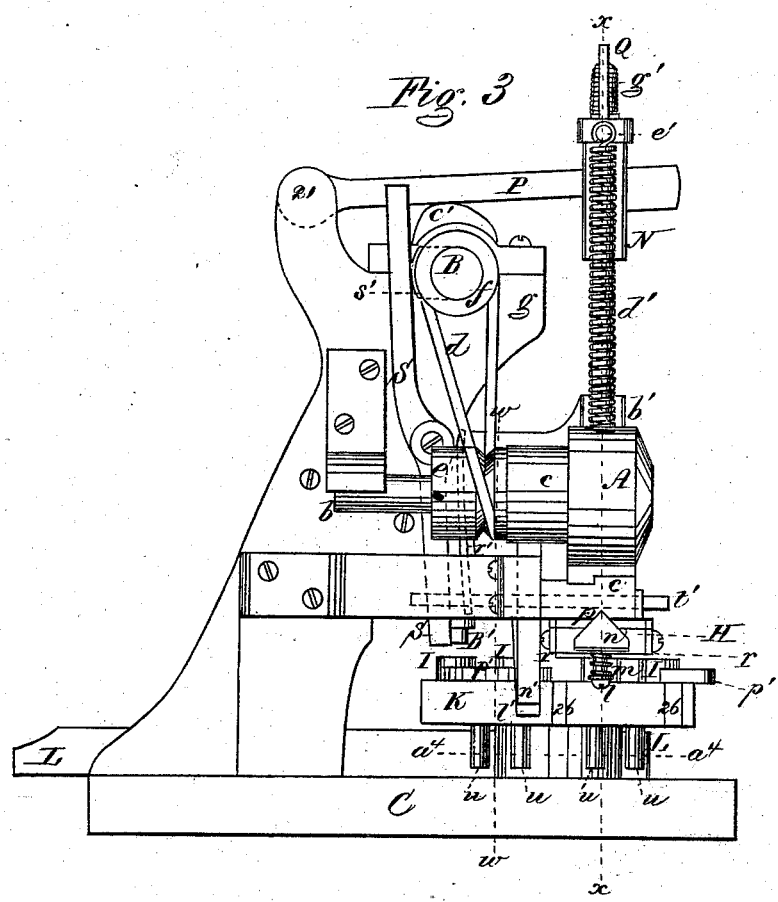

H. R. PACKARD.
Machine for Affixing Caps to Nails and Tacks.
No. 239,833. Patented April 5, 1881.
Fig. 8
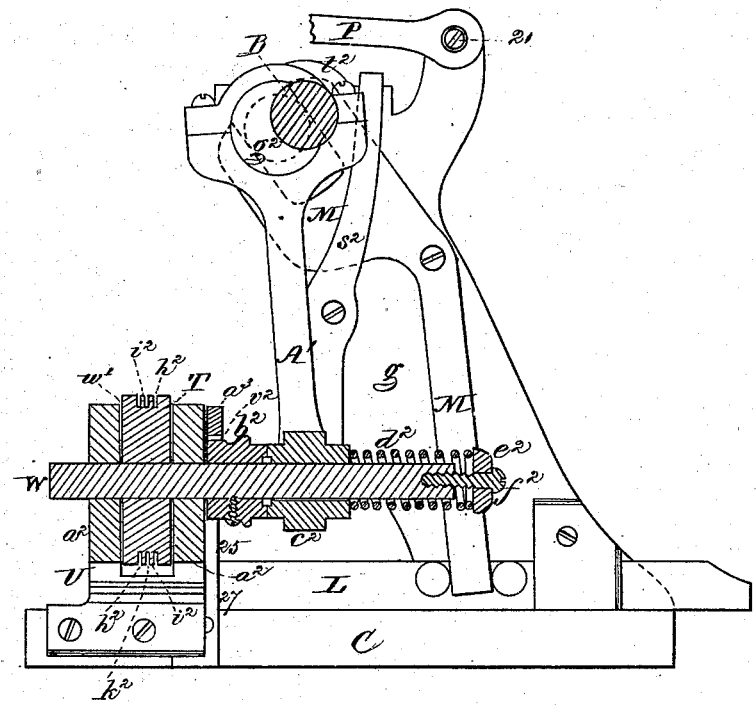
Fig. 9
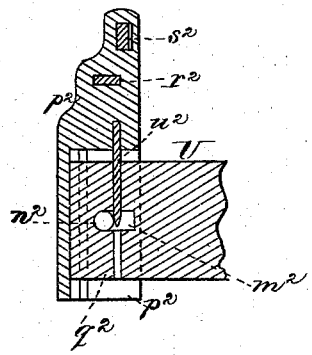
Fig. 10
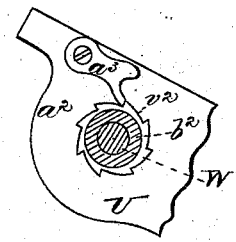
Fig. 11
Witnesses:
W. J. Cambridge
Chas. E. Griffin
Inventor,
Henry R. Packard
per F. C. Teschemacher
(Atty)

UNITED STATES PATENT OFFICE.

HENRY R. PACKARD, OF TAUNTON, MASSACHUSETTS, ASSIGNOR TO THE ALBERT FIELD TACK COMPANY, OF SAME PLACE.

MACHINE FOR AFFIXING CAPS TO NAILS AND TACKS.

SPECIFICATION forming part of Letters Patent No. 239,833, dated April 5, 1881.

Application filed February 11, 1880.

*To all whom it may concern:*

Be it known that I, HENRY R. PACKARD, of Taunton, in the county of Bristol and State of Massachusetts, have invented certain new and useful Improvements in Machines for Applying and Affixing Sheet-Metal Caps to the Heads of Tacks and Nails, of which the following is a full, clear, and exact description, reference being had to the accompanying drawings, making part of this specification, in which—

Figure 1:
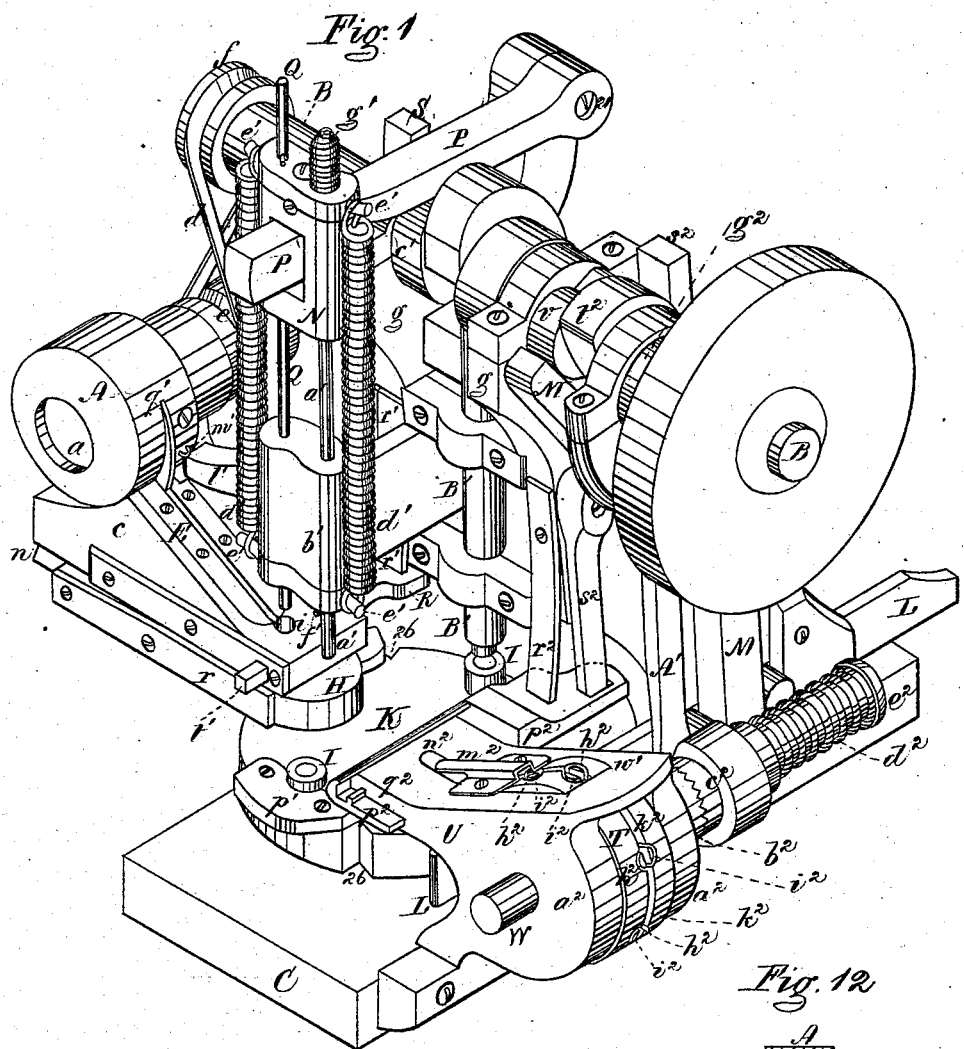
Figure 12:
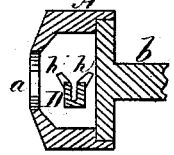
Figure 13:
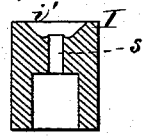
Figures 14, 15:

Figure 1 is a perspective view of my improved machine. Fig. 2 is a vertical section on the line $x\, x$ of Fig. 3. Fig. 3 is an elevation of one side of the machine. Fig. 4 is a horizontal section on the line $y\, y$ of Fig. 2. Fig. 5 is a horizontal section on the line $z\, z$ of Fig. 2. Fig. 6 is a vertical section on the line $w\, w$ of Fig. 3. Fig. 7 is a horizontal section on the line $a^4\, a^4$ of Fig. 3. Fig. 8 is a vertical section on the line $b^4\, b^4$ of Fig. 2. Fig. 9 is a horizontal section on the line $c^4\, c^4$ of Fig. 2; Figs. 10, 11, and 12, sectional details. Fig. 13 is a section, enlarged, through one of the dies. Fig. 14 is a view of one of the sheet-metal caps which are applied to the heads of the tacks. Fig. 15 is a vertical section through a tack with a sheet-metal cap applied to its head.

My invention relates to certain improvements in machines for applying and affixing sheet-metal caps to the heads of tacks and nails in order to make what are known as "lining-nails," which are generally used in lining carriages and for various other purposes. In these machines, as heretofore constructed, the two operations of placing the tacks or nails one by one in the dies, and afterward placing the sheet-metal caps over their heads, (to be subsequently secured in place by a suitable device,) have been performed by hand.

My present invention has for its object to dispense with this hand labor, and perform the two above-mentioned operations automatically; and it consists in a mechanism for feeding the tacks or nails to the dies, and properly depositing them therein, and also in a mechanism for feeding the sheet-metal caps to the dies, and placing them over the heads of the tacks or nails, to which they are afterward secured by the compression of their edges by a suitable device, whereby a considerable saving in time and labor is effected; and my invention furthermore consists in certain details of construction, to be hereinafter particularly set forth.

To enable others skilled in the art to understand and use my invention, I will proceed to describe the manner in which I have carried it out.

In the said drawings, A represents a cylindrical receptacle, within which the tacks or nails to be furnished with sheet-metal heads are introduced through a central aperture, $a$, in the front end. This receptacle A is secured to the end of a horizontal shaft, $b$, having its bearing in a support, $c$, attached to the framework of the machine, and is rotated slowly by means of a belt, $d$, passing over a pulley, $e$, and another pulley, $f$, at one end of the driving-shaft B, which runs in suitable bearings in the side pieces, $g$, of the frame-work which rise from the bed C.

Secured within the receptacle A, and extending diametrically across its interior, is a chute or way, D, composed of two parallel ways with a space or groove between them for the reception of the shank of the nail, one end of this chute being provided with flaring side pieces, $h$, Fig. 12, which serve to catch the nails as the cylinder revolves; and when the chute assumes the inclined position seen in Fig. 2 the nails descend by their own gravity, their shanks dropping into the longitudinal groove and their heads resting on the upper surface of the chute. The end of the chute D opposite to that having the side pieces, $h$, passes through an aperture in the side of the receptacle A, and when in the position seen in Fig. 2 is close to and in line with an inclined stationary chute, E, formed of two plates with a space between them for the shanks of the nails, which slide points downward from the chute D to the chute E, and down the latter to an aperture, $i$, through which they drop into a tunnel-shaped guide, G, secured within one end of a piece or holder, H, which is pivoted at or near its center to the support $c$ by means of a bolt or screw, $l$, and is held up in place against the under side of the support $c$ by a spiral spring, $m$, which surrounds the lower portion of the screw $l$.

The holder H is prevented from moving horizontally around the screw $l$ by a spring-catch, $n$, the wedge-shaped point of which enters a groove or recess, $p$, in the support $c$, thus keeping the guide G in line with the aperture $i$; and when the catch $n$ is depressed the piece H can be swung round on the screw $l$, so as to withdraw the portion containing the guide G from beneath the support $c$, so as to afford more convenient access thereto in case it should be desired to remove the guide. This guide G consists of two slides, $q\ q$, Fig. 5, which abut against each other, one-half of the opening 20 being formed in each, and these slides are pressed inward by flat springs $r$, which bear against their outer ends and serve to keep them in their proper positions with their opening 20 in line with the aperture $i$ above, and the aperture $s$ in the die I below, which is to receive the nail. A series of these dies I are secured to the upper surface of a horizontal circular table or carrier, K, which is provided with a central vertical stud, $t$, fitting into a circular aperture in the base of the machine, and is rotated intermittingly at the desired intervals to bring the dies I successively beneath the guide G by means of a hooked spring-pawl, L, which engages with a series of pins, $u$, projecting down from the under side of the carrier, this pawl being reciprocated at the required times by means of a lever, M, the lower end of which fits between two pins or projections on the pawl, the upper end of this lever being bifurcated and embracing an eccentric, $v$, on the driving-shaft B, by which it is actuated. After each movement of the carrier K it is held firmly in its proper position by a wedge-shaped spring-catch, 25, which enters one of a series of V-shaped notches, 26, in the periphery of the carrier, the form of the notches and catch admitting of the latter being forced back against the resistance of its spring 27 when the carrier is actuated by the pawl L.

Immediately after each die I has been brought under the guide G the latter is brought down thereon by a downward movement of the end of the piece H, which is depressed for this purpose against the resistance of the spring $m$ by a vertical pressure-bar, $a'$, which slides freely through a guide, $b'$, projecting from the framework, and also through a head or carrier, N, with sufficient friction to cause it to be moved by the carrier N as the latter is operated by a lever, P, which is pivoted to the frame-work at 21 and passes through a rectangular aperture in the head, the lever being raised by a cam, $c'$, on the driving-shaft B against the resistance of two spiral springs, $d'$, which are hooked over projections $e'$ at the top of the head N and bottom of the guide $b'$. The bar $a'$ is provided with a stop-pin, $f'$, which limits its upward movement, the head N sliding over its upper end as it continues to rise, the stop $f'$ causing the lower end of the rod to be in such a position as to insure its striking the piece H at the proper time on the next descent of the carrier N. Just previous to the completion of the downward movement of the carrier N the upper end of the bar $a'$ comes into contact with the upper closed end of a spiral spring, $g'$, by which it is surrounded, by which means sufficient downward pressure is exerted upon the bar $a'$ to cause it to depress the piece H against the resistance of the spring $m$. The spring $g'$ may, however, be dispensed with, and sufficient friction be produced between the bar $a'$ and the carrier N to overcome the resistance of the spring $m$ and produce the desired result.

The under side of the holder H is countersunk, so as to fit over the upper edge of the die I beneath it, the recess $h'$ thus formed having tapering sides, which insures the proper centering of the die beneath the guide when the latter is brought down by the pressure-bar $a$, as above described.

Q is a vertical rod or plunger, which slides in the guide $b'$, and is secured firmly to the carrier N, by which it is operated. As soon as a nail is delivered from the chute E, through the aperture $i$, into the guide G, point down, the plunger Q, which is located directly over the center of the aperture in the guide, is caused to descend by the movement of the lever P, and strikes the nail on the head, forcing it down through the guide into the die I beneath, the slides $q\ q$ yielding against the resistance of their springs $r$ to allow of the passage of the head of the nail and the end of the plunger, the slides being immediately returned to their normal position on the ascent of the plunger Q, when the guide is ready to receive another nail from the chute E, to be forced through the guide G, as described, into the next die I when brought thereunder by the rotation of the table K.

Each of the dies I is provided with a tapering recess, $i'$, and a central aperture, $s$, for the reception of the shank of the nail, as seen in Figs. 2 and 13, the portion immediately surrounding the aperture $s$ being slightly raised above the bottom of the recess $i'$, to allow the sheet-metal cap, which is to be afterward applied to the head of the nail, to be compressed around it by the action of a plunger, to be afterward described.

The pressure-bar $a'$ strikes the end of the piece H a little before the plunger Q comes into contact with the head of a nail in the guide G, in order that the recess $h'$ on the under side of the holder H may be brought down onto the die I to center the latter, and thus insure the point of the nail entering the aperture $s$ in the die, which it might not otherwise do, and as the plunger Q continues its descent after striking the head of the nail the carrier N slides over the bar $a'$.

The cylindrical receptacle A is arrested when the end of the chute D is brought into line with the chute E by means of a lever, $l'$, against the upper end of which a pin or projection, $m'$, on the cylinder A comes into contact, the end of this lever being momentarily withdrawn at given intervals against the resistance of a spring, $n'$, by a series of cams or inclined projections, $p'$, on the revolving table K, so as to allow the cylinder to continue its revolution, the belt $d$ slipping on its pulleys when the motion of the cylinder is arrested. The concussion produced by the pin $m'$ striking the end of the lever $l'$ insures the sliding down of the tacks or nails to the lower end of the chute D, and thence passing to the chute E.

It is essential that all of the tacks in the chute D should pass into the chute E before the cylinder A continues its revolution, for the reason that were any of the tacks to remain in the chute D they would drop out onto the floor when the end of the chute D was carried down below the upper end of the chute E by the rotation of the cylinder A. To prevent this the following device is employed:

$q'$ is a narrow rib or projection, which is attached to the cylinder A in close proximity to the end of the chute D, and in line with the center thereof, this rib extending over the upper end of the chute E, and being sufficiently narrow to pass freely through the upper end of its central groove or space. When, however, this space is filled with nails, (as must always be the case as long as any nails remain in the chute D,) the projection $q'$ cannot pass, as it will come into contact with the head of a nail in the upper end of the chute E, and consequently the cylinder A cannot revolve until all of the nails have passed out of the chute D and the upper end of the chute E. It is evident, however, that it would not answer to have the projection $q'$ bear continuously on the head of one nail, as this would prevent the descent of the nails in the chute D, and consequently the pressure of the projection $q'$ is relieved at intervals by the movements of the lever $l'$, which take place at each contact therewith of one of the cams $P'$ on the table K, the upper end of the lever $l'$, (which is inclined,) when thrown forward by its spring $n'$, striking the pin $m'$, which gives a slight backward impulse to the cylinder A sufficient to raise the projection $q'$ out of contact with the head of the nail on which it rests, and thus allow of its onward passage.

In order to prevent the line of tacks in the inclined chute E from pressing on the lower tack and creating sufficient friction to interfere with its free downward passage to the guide G, the following device is employed:

R is a horizontal slide, which moves within the support $c$ and is actuated against the resistance of a spring, $r'$, by a lever, S, which is pivoted to the frame-work and operated by a cam, $s'$, on the driving-shaft. This slide R is bifurcated, one portion, $t'$, forming a guide-bar, while the portion $u'$, which is beveled on both sides, as seen in Fig. 4, forms a finger, which, when the slide R is advanced, passes between the shanks of the two lower tacks, thus serving to hold back the whole line of tacks above the lowest tack, while the bevel on the side tends to press the lowest or front tack into the aperture $i$. The movements of the slide R and plunger Q are so timed with respect to each other that the finger $u'$ will advance to hold back the line of tacks before the plunger has been raised out of the aperture $i$; and as soon as the plunger leaves the aperture $i$ the finger throws the lowermost tack into aperture $i$, through which it falls into guide G. The finger $u'$ is not drawn back until after the plunger Q gets down again into aperture $i$, the plunger Q acting as a stop for the line of tacks when finger $u'$ is out of the way.

I will now describe the mechanism for feeding to the dies I the sheet-metal caps $v'$, which are to be applied to the heads of the tacks or nails.

T is a wheel or carrier, which revolves within a support, U, attached to the bed C, a portion of the periphery of this wheel projecting up through a slot, $w'$, in the upper surface of the support. The horizontal shaft W, to which the wheel T is secured, has its bearings in the cheeks or side pieces, $a^2$, of the support U, and is rotated intermittingly in the following manner:

$b^2$ is a collar, immovably secured to the shaft W, and having at its outer end ratchet-teeth, with which engage corresponding ratchet-teeth on the inner end of a loose collar, $c^2$, which is kept in contact with the collar $b^2$ by a spiral spring, $d^2$, placed between the collar $c^2$ and an adjustable head, $e^2$, secured to the end of the shaft W by a screw, $f^2$, by means of which the tension of the spring can be regulated as desired.

To a projection on one side of the collar $c^2$, Fig. 11, is pivoted the lower end of a connecting-rod, $A'$, the upper enlarged end of which encircles an eccentric, $g^2$, on the driving-shaft B, so that as the latter is revolved the collar $c^2$ is oscillated on the shaft W, and thus serves to impart an intermittent rotary movement to the wheel T, the periphery of which is provided with a series of recesses, $h^2$, arranged at short distances apart, as seen in Figs. 1, 2, and 8, these recesses being each adapted to receive one of the sheet-metal caps $v'$, Fig. 14, a quantity of which are placed in a hopper, (not shown,) the bottom of which is intended to fit snugly over that portion of the wheel T which projects up through the slot $w'$.

At the center of each of the recesses $h^2$ is a short circular projection, $i^2$, over which the cap loosely fits, this projection, which nearly fills the recess, rendering it impossible for the cap to assume any but the proper position within it.

Extending entirely around the periphery of the wheel T is a groove, $k^2$, which passes centrally through the recesses $h^2$ and their projections $i^2$, as seen in Figs. 1, 2, and 8, and within this groove fits a stationary finger, $l^2$, Fig. 2, located at the upper end of a stationary inclined chute or way, $m^2$, the lower end of which communicates with an aperture, $n^2$, in the support U, this aperture being located directly over the path of the dies I on the table K. As the wheel T revolves, the finger $l^2$ (which extends into the groove $k^2$ tangentially)

enters the recesses $h^2$, and, passing beneath the caps $v'$, successively lifts them therefrom into the way or chute $m^2$, down which they descend by their own gravity, passing thence one at a time into the aperture $n^2$ and onto a plate, $p^2$, which is fitted to slide on the under side of the portion $q^2$ of the support U, being held in place by suitable guides. This slide $p^2$ is moved forward at the proper time against the resistance of a flat spring, $r^2$, for a purpose to be presently explained, by means of a lever, $s^2$, pivoted to the frame-work and operated by a cam, $t^2$, on the driving-shaft B. Two parallel grooves, $k^2$, passing through opposite sides of the recesses $h^2$, each having a finger, $l^2$, may be employed, if desired, instead of a single groove and finger, as shown. The cap $v'$, when resting on the slide $p^2$, is in a position immediately over the center of a die, I, when the latter has been brought thereunder by the rotation of the carrier K, and when the slide $p^2$ is advanced by the movement of the lever $s^2$ a circular aperture, $k'$, in the slide $p^2$ is brought into line with the aperture $n^2$, which thus allows the cap previously resting on the slide to drop down, by its own weight, onto the head of the tack or nail in the die I thereunder.

In order to prevent more than one cap at a time passing down through the aperture $n^2$, a pointed rod or finger, $u^2$, Fig. 9, attached to the slide $p^2$, is arranged to project horizontally into the lower end of the chute $m^2$ when the slide is advanced to allow the cap $v'$ to drop, the point of this rod passing between the cap on the slide and the one next above, and thus serving to hold back the line of caps in the chute, the inclination or bevel of the point of the rod $u^2$ serving to slightly press back the line of caps, and thus relieve the cap on the slide of the friction which would otherwise be caused by the contact of the adjacent cap, and by this means the lowest or last cap in the line is left perfectly free to drop through the apertures $n^2$ $k'$ into the die I, and over the head of the tack or nail previously deposited therein by the mechanism before described, and when the slide $p^2$ is carried back by its spring $r^2$ the point of the rod $u^2$ is withdrawn, which allows the next cap to pass onto the slide $p^2$, ready to drop on the succeeding forward movement of the slide.

The collar $b^2$ is provided with ratchet-teeth $v^2$, with which engages a pawl, $a^3$, Fig. 10, which serves to hold the collar $b^2$ and shaft W, and allow the ratchet-teeth of the collar $c^2$ to slide over the contiguous teeth of the collar $b^2$, to take a fresh hold, in order to produce a new movement of the wheel T on the descent of the rod A'. The ratchet-teeth $v^2$ are arranged at such distance apart that when the wheel T has been moved forward by the descent of the rod A' the pawl $a^3$ will be left between two teeth, and consequently, as the rod A' ascends, the friction between the ratchet-teeth at the ends of the collars $b^2$ $c^2$ produced by the spring $d^2$ is sufficient to cause the wheel T to be rotated backward until the pawl $a^3$ comes into contact with one of the ratchet-teeth $v^2$, when the movement of the collar $b^2$ is arrested, and the collar $c^2$ continues its movement to take a fresh hold; and by thus imparting a slight backward movement to the wheel T after each forward impulse any cap which may accidentally stick is relieved, and all clogging of the machine at this point is thus avoided. After the caps have been applied to the heads of the tacks or nails in the dies I the latter are successively brought, by the rotation of the table K, beneath a plunger, B', (operated by a crank on the driving-shaft,) by means of which the caps are compressed around the heads of the tacks or nails in a well-known manner, after which the nails are ready for use.

The tacks or nails are thrown out of the dies I, after the caps have been affixed to their heads, by means of an automatic device, (not shown,) which forms no part of my present invention.

Instead of mounting the dies I on a rotating table, K, it is evident that they may be secured to a carrier of different construction, which will bring them successively into their proper positions; and instead of the pressure-bar $a'$, some other device may be used for depressing the piece H; and the mechanism for producing the backward movements of the cylinder A and wheel T may also be varied, if desired, without departing from the spirit of my invention.

What I claim as my invention, and desire to secure by Letters Patent, is—

1. In combination, rotating nail-receptacle A, chute D, extending across it and fast to it, and chute E, the chute D rotating with receptacle A to take up nails from the receptacle, and being arrested, when its discharging end is in place, to make D and E one continuous chute, and to discharge nails from D down E, all substantially as described.

2. The lever $l'$, operated at suitable intervals by the cam $p'$ and spring $n'$, in combination with the nail-receptacle A, having a pin or projection, $m'$, extending into a position to be intercepted by the lever, substantially as and for the purpose set forth.

3. The rib or projection $q'$ on the nail-receptacle A, in combination with the chute E, having a central space for the shanks of the nails and a mechanism operated at intervals to give a slight backward impulse to the cylinder to allow the nails to pass down the chutes, substantially as and for the purpose described.

4. In combination, guide G, composed of the slides $q$ $q$ and springs $r$, its holder H, having the guiding-recess $h'$, and capable of motion not only up and down, but also sidewise, pressure-bar $a'$, and the series of dies I, the upper part of each fitting the recess $h'$, the pressure-bar operating to depress the holder upon that one of the dies I beneath it, and the recess $h'$, by contact with the upper part of each die I, guiding the holder as it is depressed, and bringing its axis exactly in line with each die I, whereby guide G is brought in exact relation with each one of the series of dies I, substantially as described.

5. In combination, the revolving wheel or carrier T, with its recesses $h^2$, and projections $i^2$ fitted therein for the reception of the sheet-metal caps $v'$, mouths downward, and the finger $l^2$, fitting into a groove, $k^2$, across the recesses $h^2$, and projections $i^2$ for raising the caps out of the recesses, substantially as set forth.

6. The combination of the revolving carrier T, with its recesses $h^2$, and projections $i^2$ fitted therein and grooved at $k^2$, with the finger $l^2$, chute $m^2$, the support U, with its aperture $n^2$, and the slide $p^2$, with its aperture $k'$, through which the caps pass to the dies beneath, substantially as described.

7. The combination of the revolving wheel or carrier T, chute $m^2$, support U, having aperture $n^2$, plate $p^2$, cut away at $k'$, finger $u^2$, carried by said plate, and intermittingly revolving die-carrier $k$, substantially as described.

8. The wheel or cap-carrier T, in combination with mechanism for actuating it and for giving it a slight backward movement, substantially as and for the purpose specified.

9. The combination, with the shaft W of the carrier T, of the oscillating collar $c^2$, and the fixed collar $b^2$, with their engaging ratchet-teeth, the tension-spring $d^2$, the ratchet-teeth $v^2$, and the pawl $a^3$, whereby an intermitting rotary forward motion, together with a backward movement after a forward impulse, is given to the cap-carrier T, substantially as and for the purpose described.

Witness my hand this 13th day of January, A. D. 1880.

HENRY R. PACKARD.

In presence of—
 HERBERT O. MCCRILLIS,
 N. B. DEAN.